Figure 1:
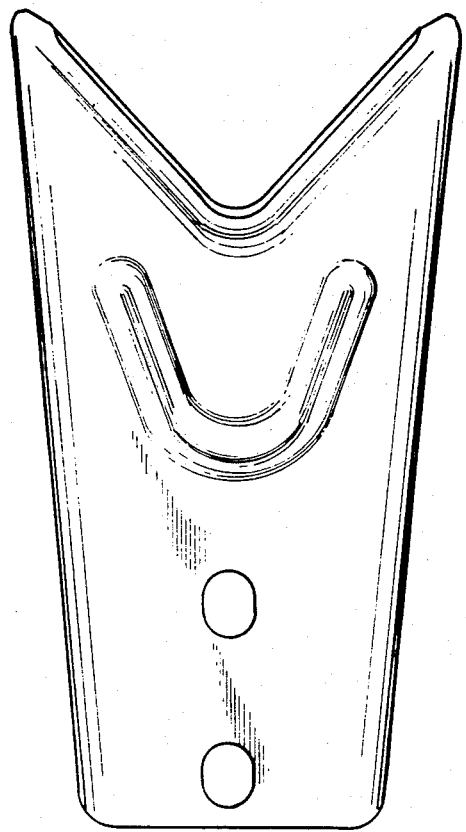

United States Patent [19]

Groethe

[11] Patent Number: 4,515,002
[45] Date of Patent: May 7, 1985

[54] METHOD OF MANUFACTURING SHEAR BLADES FOR SHEARING HOT GLASS

[76] Inventor: Roland E. Groethe, 640 Lemoyne Ave., Washington, Pa. 15301

[21] Appl. No.: 530,541

[22] Filed: Sep. 9, 1983

[51] Int. Cl.³ .............................................. B21D 28/00
[52] U.S. Cl. ....................................... 72/339; 72/364; 76/101 R
[58] Field of Search ......................... 76/101 R, 104 R; 72/339, 364

[56] References Cited

FOREIGN PATENT DOCUMENTS 494197 10/1977 Australia ........................... 76/101 R Primary Examiner—Roscoe V. Parker
Attorney, Agent, or Firm—William J. Ruano

[57] ABSTRACT

A method of making a shear blade for shearing gobs of hot glass without noticeable shear marks. The method comprises heating a blade of tool steel to a minimum of about 400° F. (for 0.08-inch thick tool steel), stamping the desired outline shape of the heated blank by one set of dies and following by forming the blade in its final shape at such temperature by a second set of dies. The method involves heating thicker shapes at higher temperatures.

7 Claims, 2 Drawing Figures

U.S. Patent  May 7, 1985  4,515,002

METHOD OF MANUFACTURING SHEAR BLADES FOR SHEARING HOT GLASS

This invention relates to a method of manufacturing a shear blade to effect highly superior shearing cuts of hot gobs of glass.

Glass objects are variously shaped by blowing or pressing hot gobs of glass from a continuous furnace. Hot gobs are pressed into molds to form articles such as sealed beam headlight parts, lighting globes, ovenware, ashtrays and others. Hot gobs are also blown into molds to form articles such as bottles, fine glassware, coffee pots and others. Volume production on a continuous basis is accomplished by placing machinery for the blowing or pressing adjacent to the furnace; and as the hot glass emerges from an orifice in the forehearth of the furnace, it is sheared into gobs of the exact size and weight for the article to be formed. The sheared gobs are dropped onto or conveyed to the molds to be blown or pressed.

The shear blades which cut the hot glass are manufactured from suitable metals and the design and shape required such that accurate and clean cuts are executed. When poor cuts are made, a scar or "shear mark" remains embedded in the glass article. Even though it is desirable to produce highly superior shear cuts on all gobs, it is recognized by those familiar and skilled in glassmaking that the shear marks have an effect on the appearance or performance of the glass article and may vary depending upon the article produced. For example—consumer products and fine crystal glassware require considerably higher appearance standards than soft drink bottles coated with plastic shells which obscure the appearance of the glass itself. For example—electronic tubes such as television picture tubes are evacuated envelopes of glass and their performance in maintaining a perfect vacuum in long-time service may be influenced by imperfections such as shear marks. Shear marks in television picture tubes can also affect the picture quality on the viewing screen.

Shear blades for highly superior shear cuts with the least possible shear mark have always been manufactured from relatively thick (approximately ⅜-inch thick) tool steel plates which are conventionally machined to the shape and design required. This traditional method is costly, time consuming, and only about 30% of the weight of the expensive tool steel plate remains in the finished shear blade after machining.

An object of the present invention is to overcome the above-mentioned disadvantages by providing a novel method of manufacturing thick shear blades with highly superior shear cutting, but which does not require the machining of solid plates of steel to achieve the shape and design.

Figure 2:

Other objects and advantages of the invention will become more apparent from a study of the following specification taken with the accompanying drawing wherein:

FIG. 1 is an elevational view of a finished shear blade embodying the present invention, and FIG. 2 is a vertical left side view taken along line 2—2 of FIG. 1.

The method of the present invention has been successfully used on shear blades of 0.080-inches thickness and up to 5/16-inches thick. The method consists of stamping the outline shape of the blade in one set of dies followed by forming the blade design in a second set of dies. The unique and novel method is made possible on the relatively thick material by heating the steel as necessary before stamping or forming in the die sets.

It is a part of the present invention that the following material temperatures are necessary for stamping the outline shape successfully. If these minimum temperatures are not adhered to, cracking of the material will occur, along with the probability the dies themselves will fracture:

0.080" thick tool steel material: 400° F.
0.100" thick tool steel material: 500° F.
0.187" thick tool steel material: 1400° F.
0.250" thick tool steel material: 1900° F.
0.310" thick tool steel material: 2100° F.

Likewise, it is a part of the present invention that the foregoing preheat temperatures are necessary "forming" the material in the specified design in the second set of dies.

In stamping the outline shape of the blade in the first set of dies, it is desirable to make the dies from "high speed" tool steels, such as Type A.I.S.I. M2 since the dies become hot during the stamping. "High speed" tool steels are capable of retaining hardness even though reaching "red" temperatures during operation. These tool steels are also referred to by those expert in the metallurgy of tool steel as "red hard" tool steels.

Oversized rectangular pieces of sheet or plate of the desired thickness are sawed or sheared from the parent sheet or plate of raw material, heated in a furnace uniformly to the minimum temperature prescribed above for the thickness being used, removed from the furnace, placed on the die set which has been readied on the stamping press and stamped to the outline-shape of the blade.

It should be noted that if the temperature used to preheat the material before stamping the blade-outline exceeds 1450° F., it is necessary to soften or anneal the resultant outline-shapes before proceeding to the second set of forming dies. Satisfactory annealing of the blade-outline pieces can be accomplished by heating from room temperature to 1400° F., holding four hours, reducing the furnace temperature to 1250° F., holding six hours, followed by cooling in still air.

The oval or round "bolt holes" used for securing the shear blades to its holder are next stamped or machined in the annealed blade outline pieces.

The properly annealed blade-outline pieces containing bolt holes are next heated uniformly from room temperature to approximately 2150° F., removed from the furnace and placed on the second set of dies to form the specified design as shown in the representative drawings attached. It is preferred to heat to approximately 2150° F. instead of just to the minimum temperatures outlined prior to forming on the second set of dies because the material is more plastic at this higher temperature and therefore reproduces the shape of the die more faithfully.

The forming operation is followed by properly tempering the entire formed final blade. This produces a tough non-brittle shear blade, heat treated to the desired hardness.

There are four primary advantages of the method of the present invention compared to machining solid plates:

1. The weight and thus the cost of the expensive tool steel material is reduced by 40 to 70%.
2. Expensive machine tools are not necessary.

3. The speed of manufacturing blades is increased by ten times.
4. Since the total cost of the finished blades is reduced by about 8 to 1, shear blades for highly superior shear cuts are now available to more segments of the fine glassware and consumer products industry.

The die construction was made experimentally of circular cutting edge blades to be applied for highly superior shear cutting of sealed beam lighting components. After determining the necessary temperatures through lengthy experimentation, designing the blades, designing the dies, machining and heat treating the dies, and manufacturing the trial blades as described in this invention, they were tested in double gob use, borosilicate glass, 60 cuts per minute. The resultant life of the blades was five days before resharpening became necessary while delivering highly superior cuts. This result was considered very satisfactory and the equivalent of those blades manufactured from relatively thick (approximately ⅜" thick) steel plates which are machined to the shape and design required. Subsequent production and additional blades substantiate these results. Also, various sizes of blades have since been manufactured with the same success.

Thus it will be seen that I have provided an efficient method of making a shear blade without the necessity of machining solid plates and by the use of a minimum amount of tool steel, thereby reducing costs greatly and obtaining highly superior shear blades suitable for shearing gobs of glass for making fine glassware.

While I have illustrated and described a single specific embodiment of my invention, it will be understood that this is by way of illustration only and that various changes and modifications may be contemplated in my invention which are within the scope of the following claims.

I claim:

1. The method of making a shear blade for shearing gobs of hot glass without noticeable shear marks, comprising heating a blank of tool steel to a minimum of about 400° F., stamping the desired outline shape of said heated blade by one set of dies followed by forming the blade in its final shape by reheating to said minimum temperature or to about 2150° F. by a second set of dies.

2. The method recited in claim 1 wherein said blade of tool steel is about 0.080" thick.

3. The method recited in claim 1 wherein said temperature is about 500° F. minimum for a tool steel blade of about 0.1-inch thick.

4. The method recited in claim 1 wherein said temperature is about 1400° F. minimum for a tool steel blade of about 0.187" thick.

5. The method recited in claim 1 wherein said temperature is about 1900° F. minimum for a tool steel blade of about 0.250" thick.

6. The method recited in claim 1 wherein said temperature is about 2100° F. minimum for a tool steel blade of about 0.310" thick.

7. The method recited in claim 1 comprising annealing the resultant outline-shape before stamping or machining the bolt holes and before proceeding to the second set of forming dies by heating from room temperature to 1400° F., holding four hours, reducing the furnace temperature to 1250° F., holding six hours, followed by cooling in still air, thereafter heating uniformly from room temperature to approximately 2150° F., removing from the furnace and placing it on the second set of dies to form the specified design.

* * * * *